(12) United States Patent
Chow et al.

(10) Patent No.: US 7,847,207 B1
(45) Date of Patent: Dec. 7, 2010

(54) METHOD AND SYSTEM TO ATTACH CARBON NANOTUBE PROBE TO SCANNING PROBE MICROSCOPY TIPS

(75) Inventors: Lee Chow, Orlando, FL (US); Guang-Yu Chai, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1658 days.

(21) Appl. No.: 10/961,929

(22) Filed: Oct. 8, 2004

Related U.S. Application Data

(60) Continuation-in-part of application No. 10/424,336, filed on Apr. 25, 2003, now Pat. No. 7,011,884, which is a division of application No. 09/528,259, filed on Mar. 17, 2000, now Pat. No. 6,582,673.

(60) Provisional application No. 60/511,787, filed on Oct. 16, 2003.

(51) Int. Cl.
*B23K 11/22* (2006.01)
*C23C 8/00* (2006.01)

(52) U.S. Cl. .................. 219/68; 423/447.1; 423/447.3; 423/585; 427/564; 228/101

(58) Field of Classification Search .................. 228/101; 423/445 R, 445 B, 448, 460, 403, 447.1; 427/564, 585, 531, 125, 123, 530; 73/1.89, 73/105
See application file for complete search history.

(56) References Cited

U.S. PATENT DOCUMENTS

| | | | |
|---|---|---|---|
| 4,025,689 A | 5/1977 | Kobayahsi | 428/402 |
| 4,228,142 A | 10/1980 | Holcombe, Jr. | 423/449 |
| 4,855,091 A | 8/1989 | Geus | 264/22 |
| 5,165,909 A | 11/1992 | Tennent | 423/447 |
| 5,346,683 A | 9/1994 | Green | 423/447 |
| 5,456,986 A | 10/1995 | Majetich | 428/403 |
| 5,543,378 A | 8/1996 | Wang | 502/174 |
| 5,560,898 A | 10/1996 | Uchida | 423/461 |
| 5,641,466 A | 6/1997 | Ebbesen | 423/447.2 |
| 5,698,175 A | 12/1997 | Hiura | 423/447.1 |
| 5,747,161 A | 5/1998 | Iljima | 428/367 |
| 5,780,101 A | 7/1998 | Nolan | 427/216 |
| 5,965,267 A | 10/1999 | Nolan | 428/408 |
| 5,986,264 A * | 11/1999 | Grunewald | 250/310 |
| 6,146,227 A * | 11/2000 | Mancevski | 445/24 |
| 6,159,538 A | 12/2000 | Rodriguez et al. | 427/213.31 |

(Continued)

FOREIGN PATENT DOCUMENTS

WO    WO 98/05920    * 2/1998

*Primary Examiner*—Roy King
*Assistant Examiner*—Michael Aboagye
(74) *Attorney, Agent, or Firm*—Brian S. Steinberger; Phyllis K. Wood; Law Offices of Brian S. Steinberger, P.A.

(57) ABSTRACT

An easy and controllable method and system to attach a carbon nanotube to a scanning probe tip such as a scanning probe microscopy (SPM) tip using a focus ion beam (FIB) technique. The method and system includes selecting a carbon fiber by a Focus Ion Beam micromanipulator, picking up the carbon fiber with the nanotube tip, forming a slot on an SPM tip, and inserting the carbon fiber with the nanotube tip into the slot.

2 Claims, 13 Drawing Sheets

U.S. PATENT DOCUMENTS

| | | |
|---|---|---|
| 6,331,209 B1 | 12/2001 | Jang et al. ................ 427/249.1 |
| 6,350,488 B1 | 2/2002 | Lee et al. ................. 427/249.1 |
| 6,413,487 B1 | 7/2002 | Resasco et al. .......... 423/447.3 |
| 6,452,171 B1* | 9/2002 | Moloni ....................... 250/307 |
| 6,455,021 B1 | 9/2002 | Saito ........................ 423/447.3 |
| 6,479,028 B1 | 11/2002 | Kaner et al. ................. 423/414 |
| 6,755,956 B2* | 6/2004 | Lee et al. ..................... 205/104 |
| 6,756,025 B2* | 6/2004 | Colbert et al. ........... 423/447.3 |
| 6,768,110 B2* | 7/2004 | Alani ......................... 250/307 |
| 6,890,654 B2* | 5/2005 | Stupp et al. ................. 428/403 |
| 7,132,161 B2* | 11/2006 | Knowles et al. ............. 428/364 |
| 2001/0024078 A1* | 9/2001 | Dimitrijevic et al. ........ 313/311 |

\* cited by examiner

METHOD AND SYSTEM TO ATTACH CARBON NANOTUBE PROBE TO SCANNING PROBE MICROSCOPY TIPS

This invention in a continuation-in-part of U.S. application Ser. No. 10/424,336 filed on Apr. 25, 2003, now U.S. Pat. No. 7,011,884 which is a divisional of U.S. application Ser. No. 09/528,259 filed on Mar. 17, 2000, now U.S. Pat. No. 6,582,673 and claims the benefit of priority to U.S. Provisional Application Ser. No. 60/511,787 filed Oct. 16, 2003.

FIELD OF INVENTION

This invention relates to nanotubes, in particular to methods and systems for attaching carbon nanotube probes to scanning probe microscopy (SPM) tips.

BACKGROUND AND PRIOR ART

Since the discovery of carbon nanotubes (CNT) in 1991, much has been done to characterize their properties and explore their potential applications. Currently, carbon nano particles including both nanotubes and monofilaments are found in extended commercial applications in modern technologies, for example, for manufacture of composite materials, nanoscale machines, flat panel displays, and computer memory devices. The wide application of carbon nanotubes is based on their unique physical and mechanical properties, which show the high electrical and thermal conductivity, and high strength values along the nanotubes' axis.

Their high aspect ratio, mechanical resilience and electrically conducting make them ideal for probe microscopy tips. There are several different types of scanning probe microscopy, including scanning tunneling microscopy (STM), scanning force microscopy (SFM), atomic force microscopy (AFM), magnetic force microscopy (MFM), and magnetic resonance force microscopy (MRFM). Nanotubes have previously been made into atomic force microscopy (AFM) tips and have proven to have great advantages in imaging and manipulation over conventional silicon and silicon nitride tips. AFM instruments are well known for producing images with resolution in the nanometer or smaller range. AFM resolution is dependent on physical characteristics of the scanning probe including composition, size, shape and rigidity of the probe. Both length and width (or diameter) of the probe affect the resolution because, for example, the length limits the maximum depth of a detail that may be measured, and the width limits the minimum breadth of a detail that may be measured. Silicon probes are commonly used, but have a tip diameter generally greater than 10 nm, and are easily damaged or worn during use. Scanning probes made of carbon nanotubes have been shown to be acceptable alternatives to silicon probes and are known to be mechanically stable.

However, there are no easy and controllable methods to attach a carbon nanotube to a scanning probe tip, due to the extremely small size of the carbon nanotubes. Previous approaches have included the mechanical attachment of a CNT onto an AFM tip, chemical vapor deposition growth of a CNT directly onto commercial atomic force microscope made of Si or one of its derivatives, and electric or magnetic field induced multiwall nanotube probe attachment.

Mechanical attachment of nanotubes on a scanning probe tip using optical microscope was developed in 1996. See Dai, Hafner, Rinzler, Golbert and Smalley, Nature 384, 147 (1996). In this process, micromanipulators are used to control the positions of a commercial cantilever tip and a bundle of nanotubes, while viewing with an optical microscope. This approach has allowed the initial development of nanotube tips although it has significant limitations. Firstly, the assembly procedure inherently selects towards thick bundles of nanotubes since these are easiest to observe in the optical microscope Bundles are selected because it is extremely difficult to observe an individual nanotube due to its nanometer size. However, mechanical assembly of nanotube tips has also been performed inside a scanning electron microscope (SEM). The use of the SEM still limits assembly to nanotube bundles or nanotubes with diameters greater than 5-10 nm and, moreover, increases greatly the overall time required to make one tip. Secondly, well defined and reproducible tip etching procedures to expose individual nanotubes do not exist. Thirdly, a relatively long time is required to attach nanotubes to commercial cantilevers, thus increasing the cost.

To overcome the limitations of mechanical attachment of nanotubes, direct growth of carbon nanotubes on the tip by chemical vapor deposition (CVD) was developed in 1999. See Hafner, Cheung, and Lieber, J. Am. Chem. Soc. 121, 9750 (1999). In this technique, a flattened area was created at the cantilever tip, pores were etched into the flat area and a catalyst was deposited into the pores. CVD was then used to allow nanotubes to grow from the tip in alignment with the pores. This method produced thin, individual multiwall CNT tips, however there was no control over the orientation of the nanotubes. For SPM tip application, the nanotube has to be perpendicular to the surface.

Alternative methods to attach a carbon nanotube to a scanning probe tip were electric field induced attachment which was developed in 2000 and magnetic field induced alignment which was developed as in 2003. See Stevens, Nguyen, Cassell, Delzeit, Meyyappan, and Han, Appl. Phys. Lett., 77 3453 (2000) and Hall, Mathews, Superfine, Falvo, and Washburn, Appl. Phys. Lett., 82, 2506 (2003). In these technique, electric or magnetic fields are used to align the carbon nanotube along the scanning probe tip axis. The electric or magnetic field induced attachment provides advantages in adjustment of the orientation of the nanotubes, however, the methods require precoating to improve conductivity. The four above described methods were somewhat arduous have met with difficulties in adhesion, reproducibility, and process control. It has been demonstrated already that carbon nanotubes (CNT) are excellent scanning probe tips. However, as discussed above, there are no easy and controllable methods to attach a carbon nanotube to a scanning probe tip, due to the extremely small size of the carbon nanotubes.

The present invention contributes a more consistent and controlled method for attaching a novel carbon nanotube probe to the SPM cantilever tip using Focus Ion Beam (FIB) technology. Through the method of the present invention, a FIB tool is used to form a slot in the SPM cantilever tip and the carbon nanotube probe is inserted into the formed slot. The inserted carbon nanotube probe is welded to the SPM cantilever tip using the FIB tool to deposit metal atoms to the joint between the carbon nanotube probe and the cantilever tip, thus welding the carbon nanotube probe to the cantilever tip.

SUMMARY OF THE INVENTION

A primary objective of the present invention is to provide a method and system using Focus Ion Beam (FIB) technology to attach novel nanotube probes to SPM (scanning probe microscope) tips.

A secondary objective of the present invention is to provide an easy and controllable method and system for attaching carbon nanotubes to a scanning probe tips. Our new method uses the Focus Ion Beam (FIB) technique to attach our unique nanotube probe to the SPM tips. The FIB technique is a standard well-developed technique. It is very controllable and the carbon nanotube can be attached in a very perpendicular manner. The carbon fiber of our unique carbon nanotube probe provides excellent mechanical stability.

A novel nanotube probe is prepared by catalytic chemical vapor deposition method. Plural carbon fibers are provided along with the nanotube probe and a metal wire with a silver paint coating is used to stick the micron size carbon fibers and carbon nanotube probe for FIB pickup. The SPM cantilever tip is milled using the ion beam of an FIB to form a slot for receiving the carbon nanotube probe. A micro manipulator is then used to pick up a carbon fiber with nanotube tip and align it within the slot in the cantilever tip perpendicular to the axis. Once aligned, FIB welding is used to deposit metal atoms to fill the gap between the carbon fiber and the wall of the slot in the cantilever tip, thus welding the carbon fiber with nanotube tip and the scanning probe cantilever tip to produce the nanotube scanning tip.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
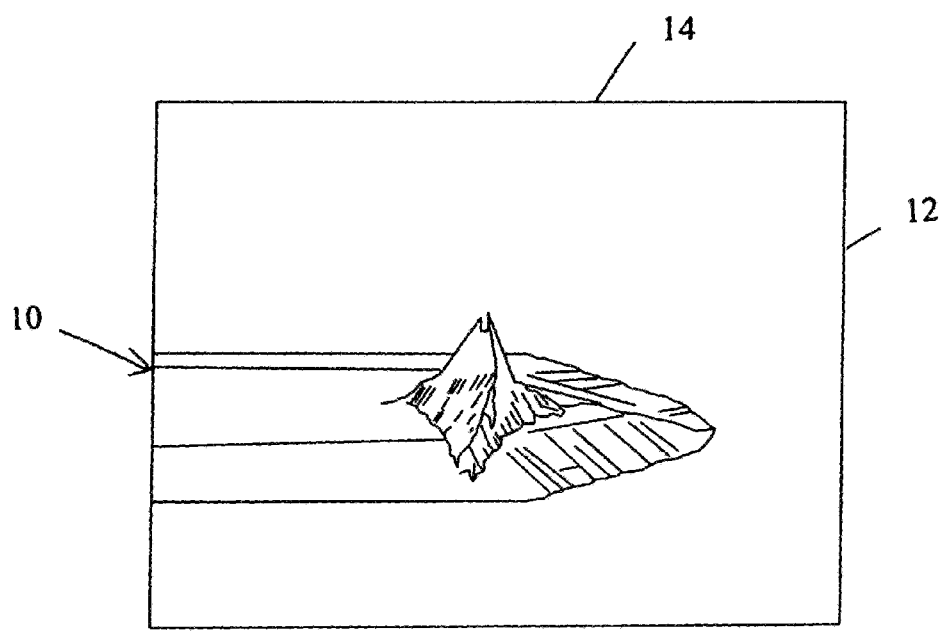
FIG. 1 is a diagram of a SPM cantilever tip with a carbon nanotube probe attached thereto.

The method and system of the present invention produces a nanotube scanning tip as shown in FIG. 1. The nanotube scanning tip 10 comprises a carbon nanotube probe 14 attached perpendicular to the cantilever tip 12 axis. The system for attaching the carbon nanotube probe to the scanning probe includes a novel carbon fiber with a nanotube tip and a means for retrieving and picking up the carbon nanotube probe. An FIB tool is used to form a slot on a SPM tip, insert the carbon fiber with a nanotube tip into the slot on the SPM tip, and bond the carbon fiber with a nanotube tip in the slot on the SPM tip.

Figure 2:
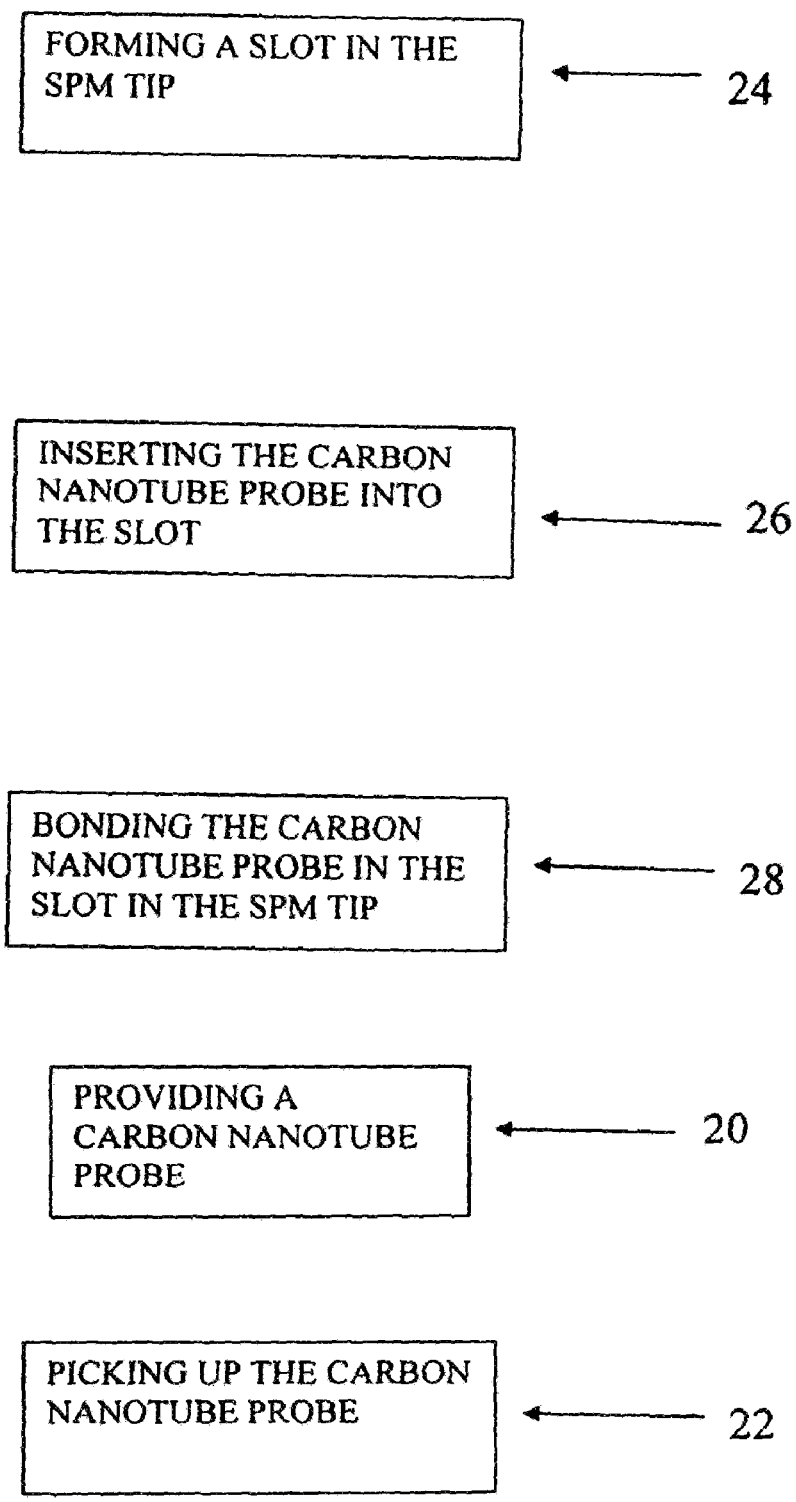
FIG. 2 is a flow diagram of process steps for attachment of the carbon nanotube probe to a SPM cantilever tip.

A method for attaching the carbon nanotube probe 14 to a conventional scanning probe cantilever tip 12 will now be describe in detail. FIG. 2 is a flow diagram of the method steps for attachment of the carbon nanotube probe to the SPM cantilever tip. For purpose of illustration and description, and not limitation, the method is described for attaching a nanotube with a graphitic outer layer as described in U.S. Pat. No. 6,582,673 and U.S. Pat. No. 7,011,884 issued to the same inventor and assigned to the same assignee which are incorporated by reference, to a scanning probe cantilever tip. The carbon nanotube probe comprises an individual carbon nanotube as an inner core of a much larger carbon fiber. The individual multiwall CNT sticks out as a tip of the carbon fiber resembling a co-axial cable. The nanotube and the graphitic outer layer are collectively hereinafter referred to as a carbon nanotube probe.

Figure 9:
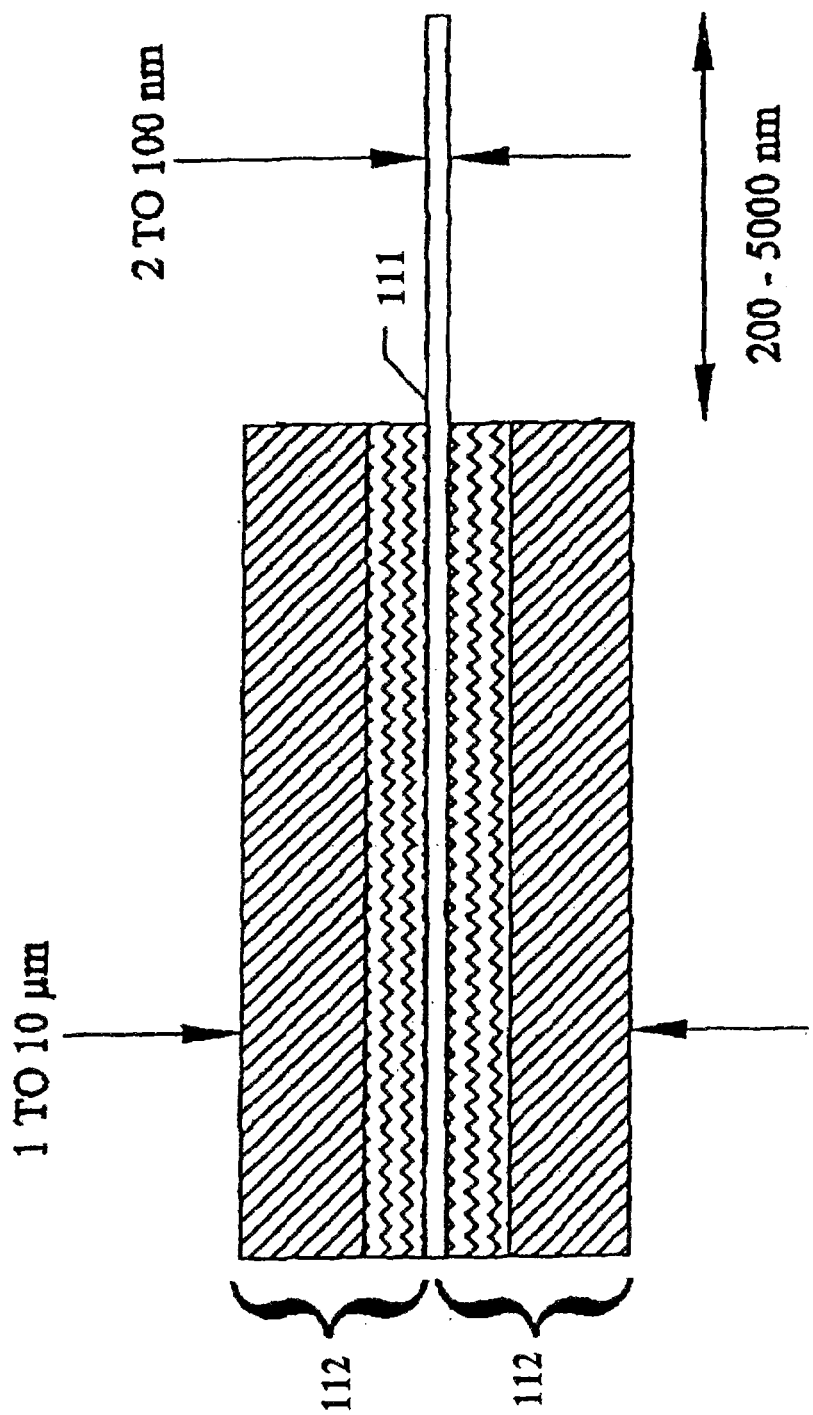
FIG. 9 is a diagram of a carbon nanotube with a graphitic outer layer—amorphous carbon coated with graphitic carbon.
Figure 10:
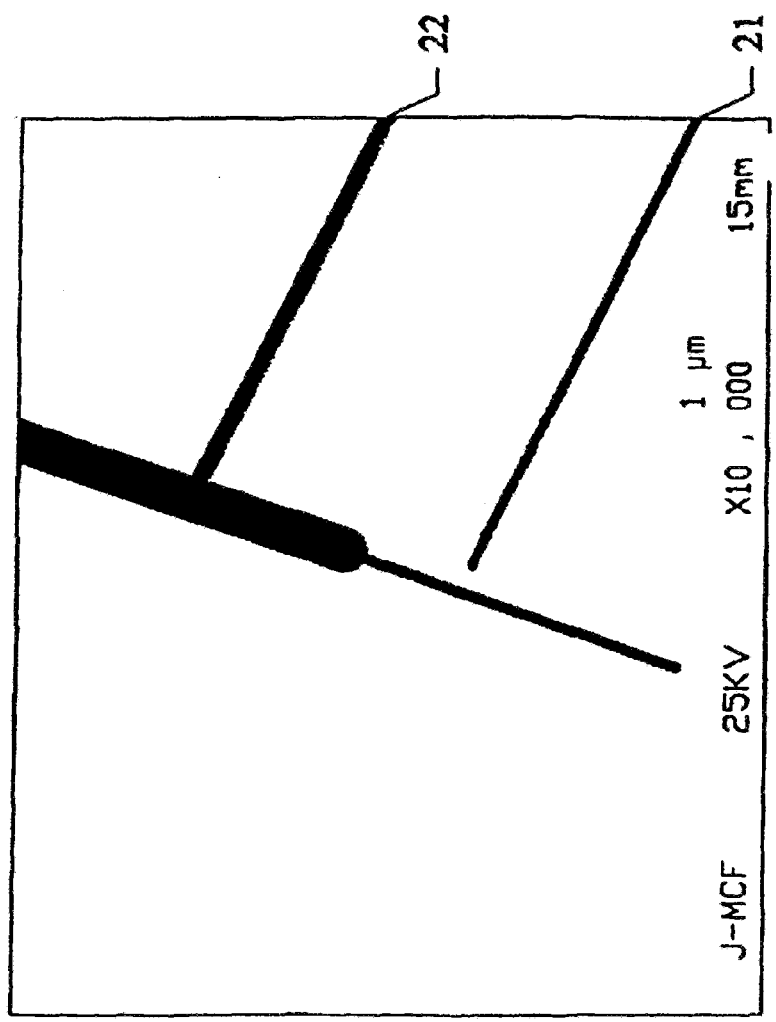
FIG. 10 is a scanning electron micrograph of a nanotube with a graphitic outer layer.

FIG. 9 shows the carbon nanotube probe described in U.S. Pat. No. 7,011,884. The carbon nanotube (111) is initially grown in a catalytic chemical vapor deposition process (CVD) produced in an early phase of the manufacturing process and with adjustments in reaction conditions, the graphitic outer layer (112) grows on the outside of the nanotube. FIG. 10 shows the scanning electron micrograph of the carbon nanotube device after a portion of the graphitic material (122) has been mechanically removed from the nanotube core (121). The outer graphitic layer serves several purposes. For example, it provides a mechanical coupling between the nanotube and the probe tip when used as a tip for scanning probe microscopes (SPM). SPM include a variety of proximity probe microscopes, for example: scanning tunneling microscope (STM). atomic force microscope (AFM), magnetic force microscope (MFM), scanning capacitance microscope (SCM) and the like.

Figure 3:
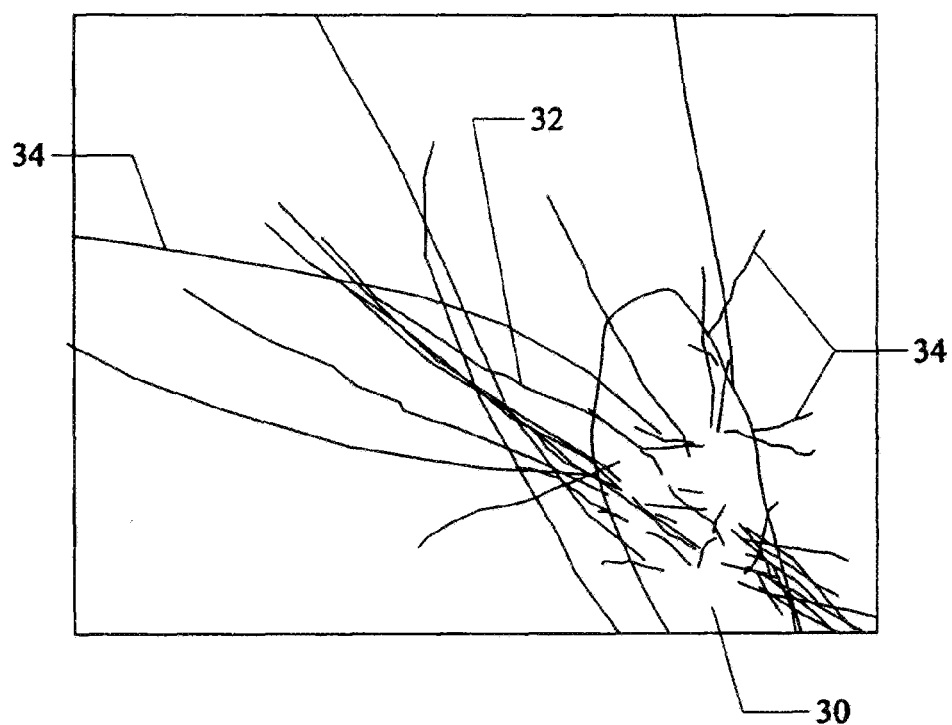
FIG. 3 is a diagram of a metal tip with silver paint coating that is used to pick up plural carbon fibers and the carbon nanotube probe.

The novel carbon nanotube probe is prepared by catalytic chemical vapor deposition following the method described in U.S. Pat. No. 6,582,673. Plural carbon fibers are provided along with the carbon nanotube probe for use in attaching the carbon nanotube probe to the SPM cantilever tip. In step 20 of FIG. 2, a metal (tungsten) tip 30, or wire, with a silver paint coating is used to pick up micron size carbon fibers 34 and the carbon nanotube probe 32 as shown in FIG. 3. In step 22 of FIG. 2, the carbon nanotube probe is picked up using a focus ion beam micromanipulator for attachment to the SPM cantilever tip 110.

Figure 4:
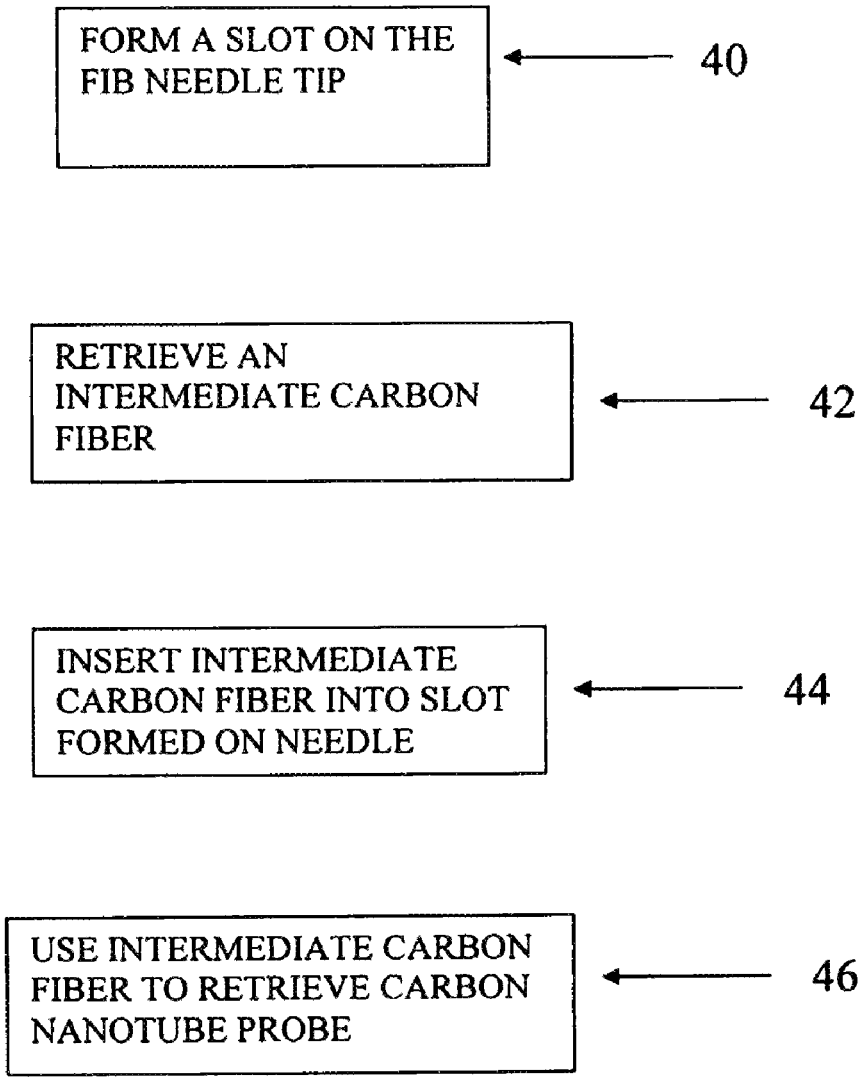
FIG. 4 is a flow diagram of process steps for picking up the carbon nanotube probe.

FIG. 4 is a flow diagram of the steps for picking up the carbon nanotube probe. The micromanipulator can only move with 3 free degrees, x,y,z. In order to adjust the carbon nanotube probe CNT tip alignment angle freely, an intermediate carbon fiber is used to pick up the carbon nanotube probe. The micromanipulator used in the picking up process is equipped with a metal needle in the FIB chamber. Using FIB milling, a slot is formed on the needle tip perpendicular to the needle axis for receiving the intermediate carbon fiber. The FIB tool can cut away (mill) material from a defined area with dimensions typically in square microns or deposit material onto it. The FIB tool uses a controlled beam of ions to remove material from a specimen with surgical precision. In step 22 of FIG. 4, the micromanipulator picks up one of the plural carbon fibers stuck on the tungsten tip for use as an intermediate carbon fiber. Later on, the intermediate fiber is used as the new tip of the micromanipulator for picking up the carbon fiber with nanotube probe.

Figure 5:
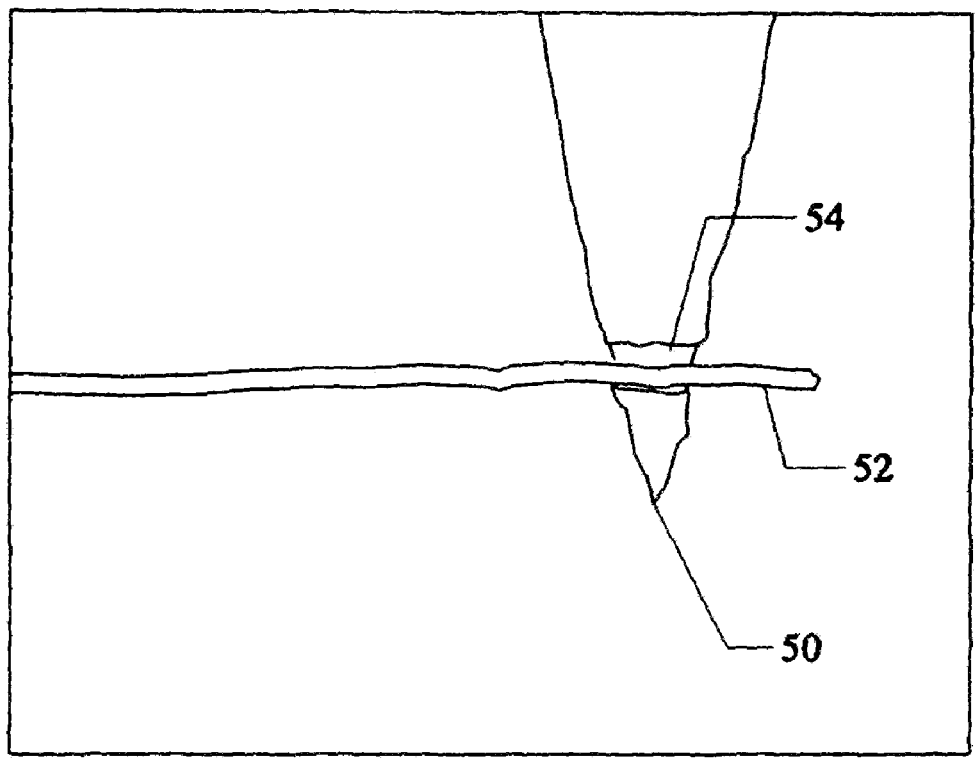
FIG. 5 is a diagram of a micromanipulator needle picking up an intermediate carbon fiber.

The intermediate carbon fiber 52 is inserted into the slot 54 formed on the needle tip 50 as shown in FIG. 5. Then using the FIB tool, the intermediate carbon fiber is welded in the slot 54. This is not conventional welding wherein heat is used to melt down metal and bond two different objects with the metal. In the preferred embodiment of the present invention, the FIB tool is used to deposit metal atoms, one by one, to the joint between the carbon fiber and the wall of the slot to form a pile of Pt metal approximately one micron in size that bonds the carbon fiber to the SPM tip. The geometry of the plural carbon fiber is a cylinder. When touching with a plane surface or another cylinder (another carbon fiber), the contact is only a single line or even a single point, which will make the later on weding junction weak. Ion milling of the slot before each welding step is done at the desired contact position to avoid point-to-point or line-to-line contact and to make the welded junction stronger.

Figure 6A:
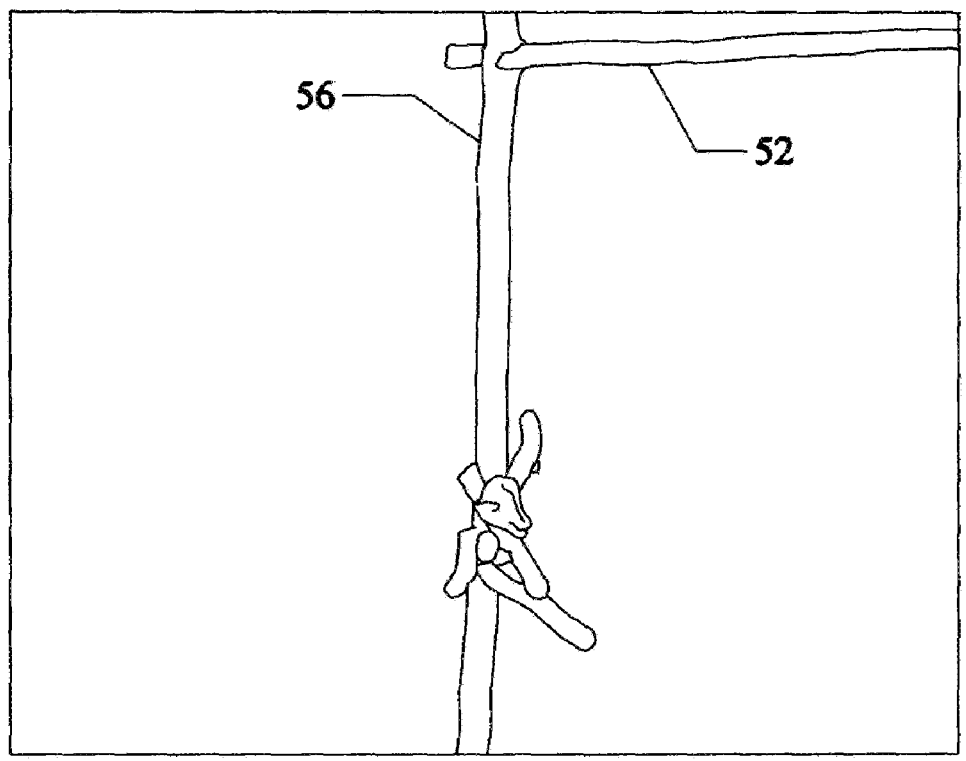
FIG. 6A is a diagram of the intermediate carbon fiber picking up a carbon nanotube probe.
Figure 6B:
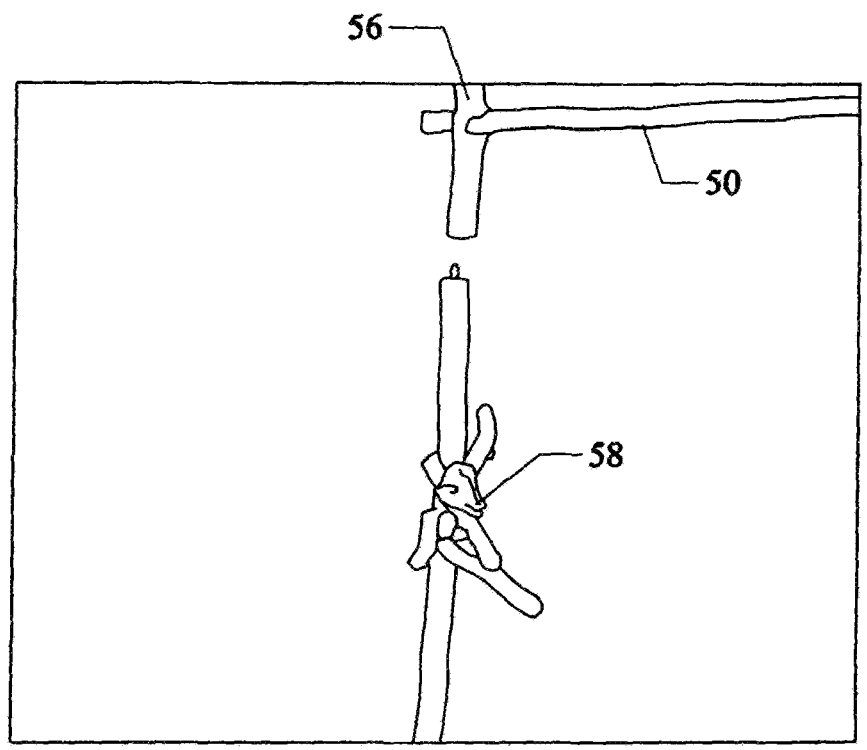
FIG. 6B is a diagram of the carbon nanotube probe separated from the root.

The intermediate carbon fiber is used as a new metal needle in step 46 of FIG. 4 to pick up the carbon nanotube probe. FIG. 6A shows the intermediate carbon fiber 52 picking up the novel carbon nanotube probe 56 for attachment to the SPM cantilever tip. Once welded in place, FIB milling is used to cut the carbon nanotube probe 56 from the root 58 as shown in FIG. 6B.

FIB milling is also used to prepare the cantilever tip for receiving the carbon nanotube probe and for attaching the carbon nanotube probe to the SPM cantilever tip. Since the carbon nanotube probe tip can be easily damaged by the ion beam, the intermediate carbon fiber and carbon nanotube probe are kept a safe distance from the ion beam during the milling step. Therefore, scanning electron microsopy (SEM) is applied to the carbon nanotube probe to determine the dimension of the graphitic outer layer.

Figure 7A:
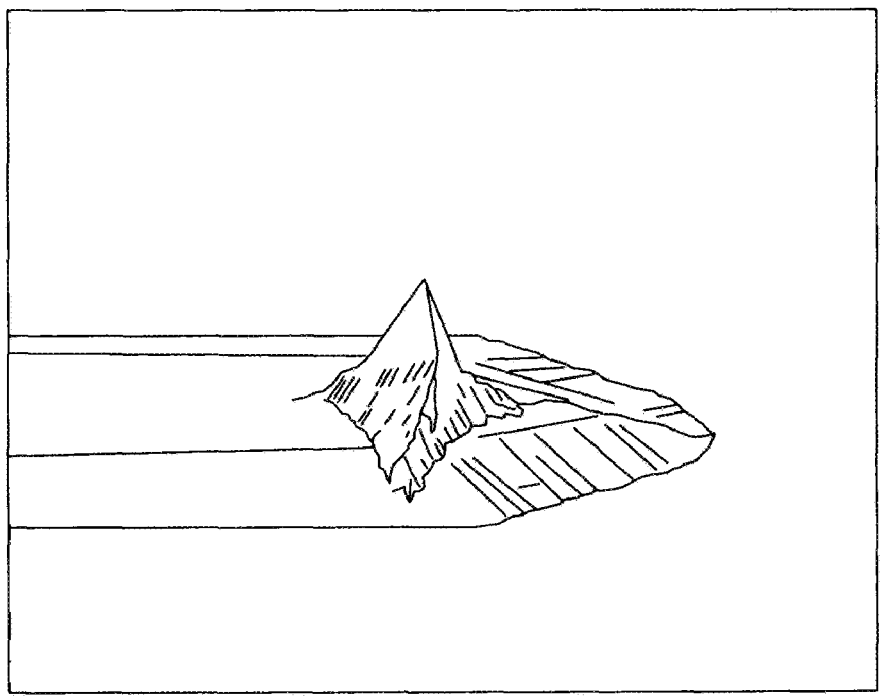
FIG. 7A is a diagram of a conventional SPM having a pyramidal cantilever tip.
Figure 7B:
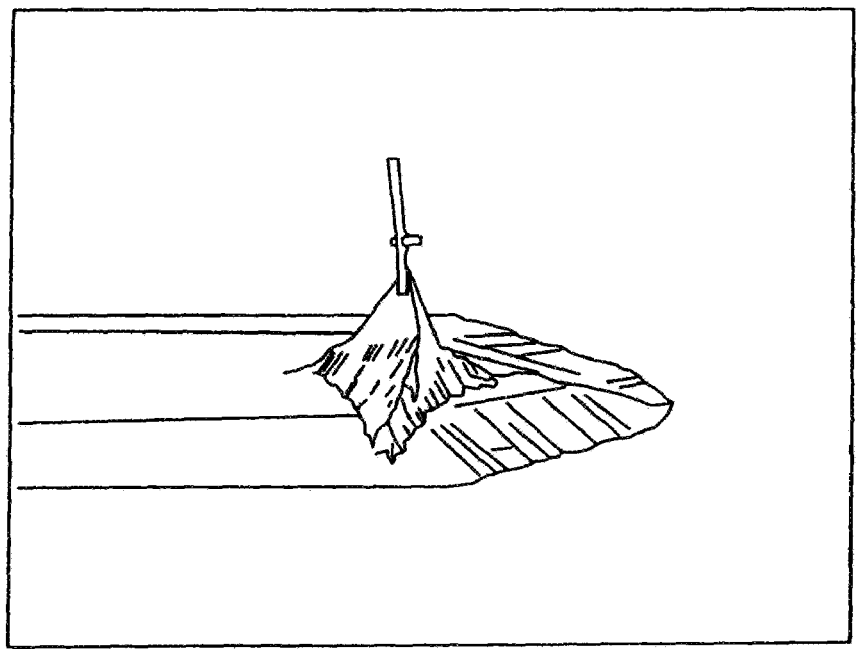
FIG. 7B is a diagram of a slot milled in the cantilever tip.
Figure 8A:
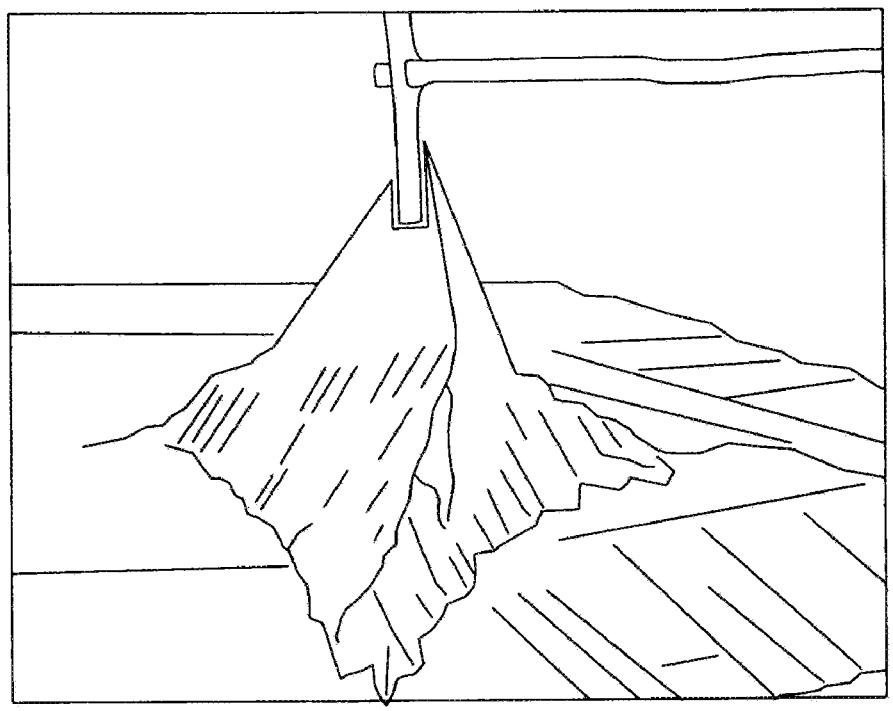
FIG. 8A is a diagram of the carbon fiber with nanotube tip being inserted and aligned in the slot on the cantilever tip.
Figure 8B:
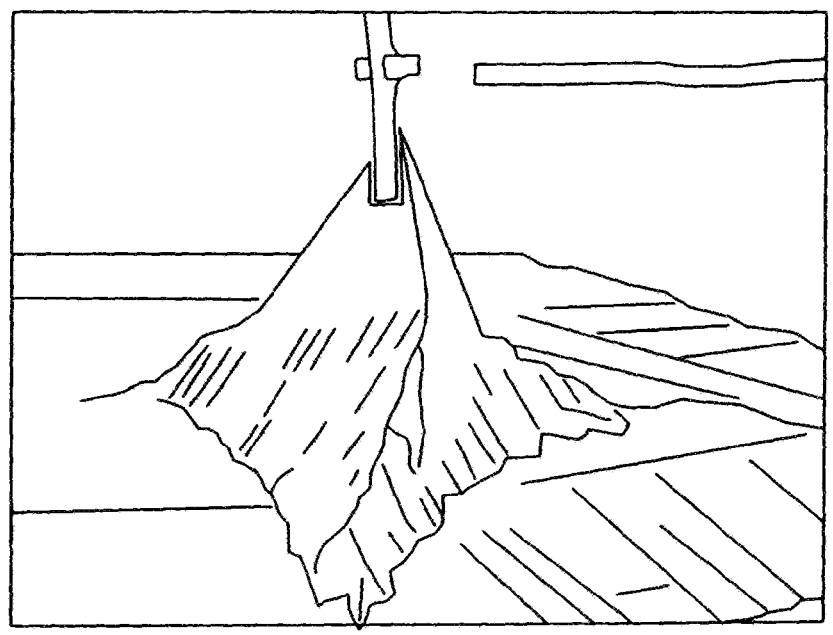
FIG. 8B is a diagram of the intermediate carbon fiber detached from the carbon nanotube probe.

FIG. 7A shows a conventional pyramidal cantilever tip of prior to attachment of the carbon nanotube probe. In step 24 of FIG. 2, ion milling with the FIB tool is used to mill a slot in the tip of SPM cantilever tip as shown in FIG. 7B. The width of the slot formed in the cantilever tip is sufficiently greater than the graphitic layer diameter to allow alignment of the carbon nanotube probe perpendicular to the cantilever tip axis in this example. In step 26 of FIG. 2, the carbon nanotube probe inserted and aligned in the slot formed in the cantilever tip. Using the FIB tool, the carbon nanotube probe is welded into the slot in the SPM cantilever tip with a Pt or tungsten metal to form a pile of metal approximately one micron in size to bond the carbon nanotube probe to the cantilever tip. Other means for affixing the carbon nanotube probe to the SPM cantilever tip may be used and are understood to be within the scope of the present invention. After the carbon nanotube probe is attached to the cantilever tip, FIB milling is used to detach the intermediate fiber from the carbon nanotube probe as shown in FIG. 8B. The resulting scanning probe nanotube tip shown in FIG. 1 is ready for application.

While the method and system of the present invention have been illustrated and described for attachment of a carbon nanotube probe to a pyramidal cantilever tip, the method may also be used for attaching carbon fibers or nonotubes to other geometrical surfaces such as parallel to another tungsten tip for use testing other surface properties. In another example, the carbon nanotube is attached is attached using the novel method to a sharpened tungsten wire for field emission testing. Other uses for the novel attachment method will be obvious to those skilled in the art. The method of the present invention combines milling and welding using FIB tools to prepare a surface for receiving a carbon fiber and carbon nanotube probe and for attaching the same to the prepared surface. Each milling and welding step is reliable and controllable and can be accomplished in minimum time, thus reducing fabrication cost. By arranging the angle between the intermediate file and the nanotube probe, plus the five degree of free movement of the FIB tool, the carbon fiber with nanotube tip can be precisely aligned with the conventional scanning probe cantilever tip axis. Another advantage of the present invention is the use of mechanical fabrication processes to eliminate the need for precoating for conductivity.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of attaching a carbon nanotube probe to a scanning probe microscopy tip, consisting of the steps of:
    providing a carbon nanotube probe consisting of a carbon nanotube as an inner core resembling a co-axial cable with the carbon nanotube extending a distance from an integrally attached outer graphic layer as a nanotube tip;
    retrieving and picking up the carbon nanotube probe consisting of the steps of:
        picking up an intermediary carbon fiber with a micromanipulator; and
        using the intermediary fiber to pick up the carbon nanotube probe;
    forming a slot on a needle of a scanning probe microscopy tip with a focus ion beam, the slot perpendicular to the needle axis;
    inserting the carbon fiber with the nanotube tip into the slot on the needle of the scanning probe microscopy tip; and
    welding the carbon nanotube probe in the slot on the needle of the scanning probe microscopy tip using a focus ion beam technology to deposit metal to the interface between the carbon nanotube probe and the slot in the needle of the scanning probe microscopy tip to bond the carbon nanotube probe to the microscopy tip.

2. The method of claim 1, wherein the inserting step further includes the step of:
    aligning the carbon nanotube probe in the slot on the SPM tip.

* * * * *